(12) United States Patent
Ikeda et al.

(10) Patent No.: US 6,273,594 B1
(45) Date of Patent: Aug. 14, 2001

(54) VEHICLE INDICATOR LAMP

(75) Inventors: Yoshimi Ikeda; Kazuhiro Hanamori, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/469,915

(22) Filed: Dec. 22, 1999

(30) Foreign Application Priority Data

Dec. 25, 1998 (JP) .................................................. 10-368821

(51) Int. Cl.[7] ........................................................ B60Q 1/00
(52) U.S. Cl. ........................... 362/510; 362/544; 362/230; 362/268
(58) Field of Search .................................... 362/509, 510, 362/543, 544, 293, 237, 240, 249, 268, 230

(56) References Cited

U.S. PATENT DOCUMENTS

| 5,081,564 | 1/1992 | Mizoguchi et al. . |
| 5,287,101 | 2/1994 | Serizawa . |
| 5,552,969 | * 9/1996 | Murakami .............................. 362/245 |
| 5,552,970 | 9/1996 | Takezawa et al. . |
| 5,580,165 | 12/1996 | Natsume et al. . |
| 5,692,824 | 12/1997 | Ooishi . |

* cited by examiner

*Primary Examiner*—Thomas M. Sember
(74) *Attorney, Agent, or Firm*—Fish & Richardson P.C.

(57) ABSTRACT

A vehicle indicator lamp is described that radiates red light and which has a superior sense of transparency and an excellent appearance. The lamp includes a cylindrical red transparent cap around a light-source bulb with respect to a lamp chamber for a rear fog lamp. A reflective surface forms the rear portion of the lamp chamber and diffuses and reflects light from the light-source bulb. A portion of a front lens is formed of a colorless transparent lens. When the lamp chamber is observed from the front, the reflective surface is visible through the colorless transparent lens and the red color of the red transparent cap can be seen reflected on the entire surface of the reflective surface or a part thereof. As a result, the sense of transparency of the lamp fixture is improved and the vehicle indicator lamp exhibits a novel appearance compared with that of conventional lamps having a single front red lens.

5 Claims, 4 Drawing Sheets

FIG. 4-(a)
PRIOR ART
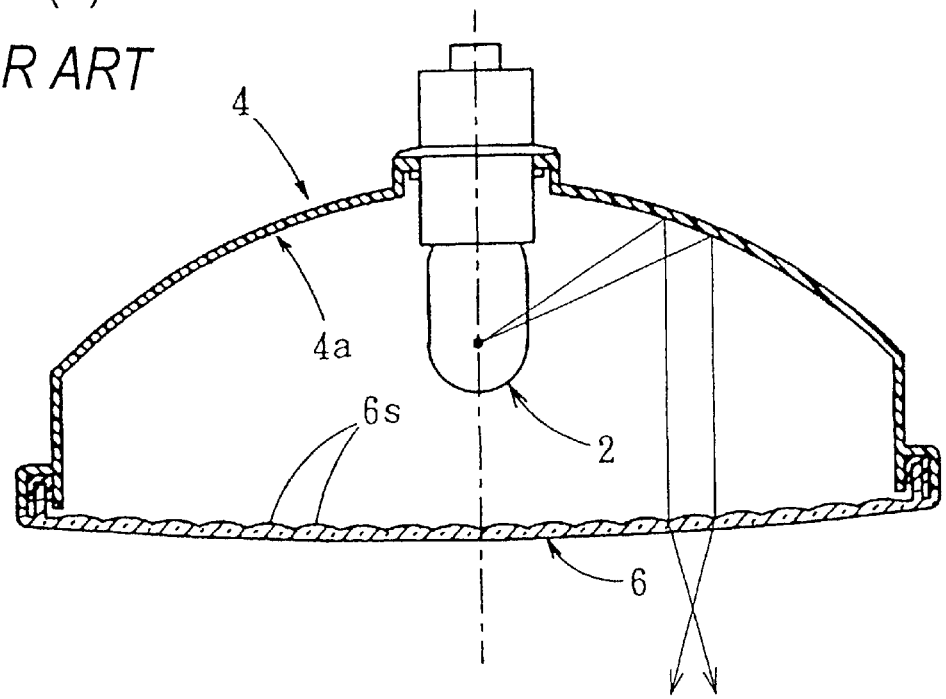
FIG. 4-(b)
PRIOR ART
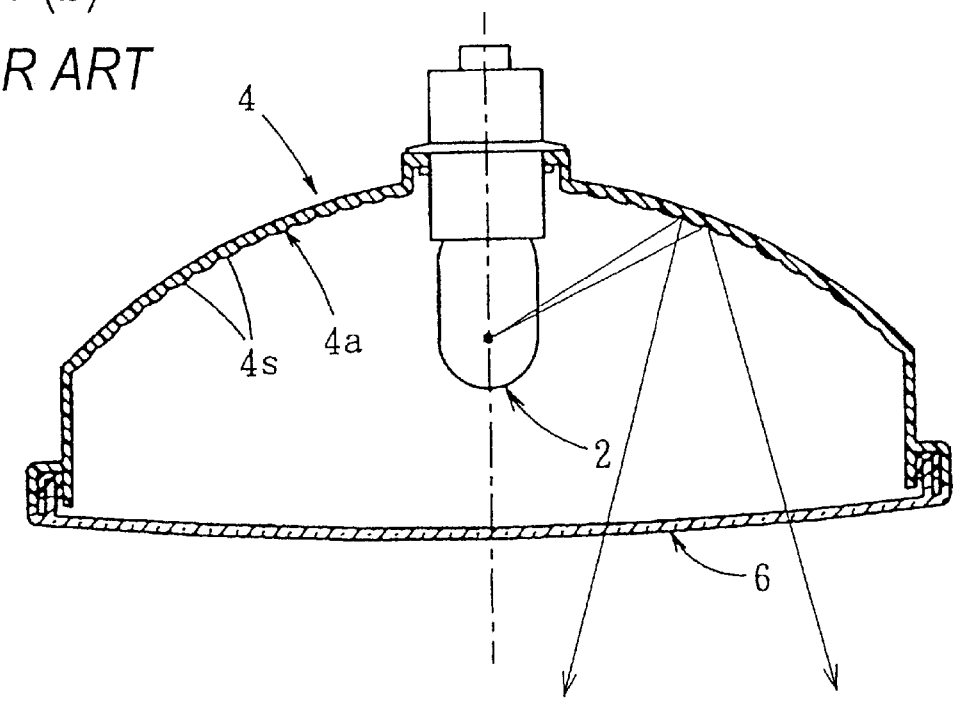

VEHICLE INDICATOR LAMP

BACKGROUND OF THE INVENTION

The present invention relates to a vehicle indicator lamp which radiates red light.

A vehicle indicator lamp such as a tail lamp, stop lamp, and rear fog lamp is structured to radiate red light to the front (front with respect to the lamp fixture and rear with respect to the vehicle body, hereinafter referred to as the front).

FIG. 4(a) shows a conventional indicator lamp that radiates red light and is structured as to reflect light from a light-source bulb 2 to the front as parallel light by a reflective surface 4a of a lamp body 4. This parallel reflected light is then diffused by a plurality of diffusion lens elements 6s formed on a red front lens 6 such that red light is radiated to the front of the lamp fixture in a predetermined light distribution pattern.

A lamp structure has recently been proposed wherein the reflective surface 4a of the lamp body 4 is formed of a plurality of diffusion and reflection elements 4s, as shown in FIG. 4(b), such that the light from the light-source bulb 2 is reflected to the front as diffused light. This makes it possible to form the front lens 6 of a red transparent lens, which in turn gives the lamp fixture a sense of transparency and makes it possible to achieve a predetermined light distribution pattern of red light.

However, conventional vehicle indicator lamps are unattractive in appearance. In particular, the lamp fixture of FIG. 4(a) includes a plurality of diffusion lens elements 6a formed on the front lens 6 so that the inner portion of the lamp fixture is difficult to see and therefore lacks a sense of transparency. In the lamp fixture in FIG. 4(b), despite a certain degree of a sense of transparency gained by using the transparent lens 6, the transparent lens 6 is colored red which makes it that much more difficult to see the inner portion of the lamp fixture such that the sense of transparency is not improved.

SUMMARY OF THE INVENTION

The present invention provides a vehicle indicator lamp which radiates red light and which has a superior sense of transparency and an excellent appearance. The present invention achieves the foregoing aim by providing a region formed of a colorless transparent lens in the front lens and by using a predetermined red transparent cap.

According to the present invention, a vehicle indicator lamp includes a light-source bulb, a lamp body having a reflective surface which reflects light from this light-source bulb to the front, and a front lens provided at the front of the lamp body. The structure provides red light radiated to the front. The lamp includes a cylindrically-shaped red transparent cap around the light-source bulb, wherein the reflective surface is formed so as to diffuse and reflect the light from said light-source bulb, and wherein at least a front portion of the reflective surface in the front lens is formed of a colorless transparent lens.

The above-mentioned "reflective surface" may be formed with a slightly curved surface or with a plurality of reflective elements, so as to diffuse and reflect light from the light-source bulb.

The above-mentioned "colorless transparent lens" may be formed to cover the entire surface of the front lens or a part thereof, at least at the front portion of the reflective surface.

A vehicle indicator lamp according to the present invention includes a cylindrically shaped red transparent cap around the light-source bulb thereof. As a result, red light impinges on the reflective surface of the lamp body, and is diffused and reflected thereby. The red light then passes through the colorless transparent lens and is directly radiated to the front. Therefore, appropriately setting the diffusion and reflection angle according to the reflective surface enables a specific lamp fixture light pattern to be achieved.

Since at least the front portion of the reflective surface of the front lens of the vehicle indicator lamp is formed of a colorless transparent lens, the reflective surface is visible because it is observable through this colorless transparent lens when the lamp fixture is viewed from the front. The red color of the red transparent cap can be seen reflected on the entire reflective surface or a part thereof, depending on the angle of view. Therefore, the sense of transparency of the lamp fixture is improved and the vehicle indicator lamp has an eye-catching appearance compared with conventional lamps having a single front lens formed as a red transparent lens. A vehicle indicator lamp according to the present invention thus radiates red light and can be made to have a superior sense of transparency and an excellent appearance.

In the foregoing construction, the structure of the portion other than the colorless transparent lens in the front lens is not specifically limited. If that portion is formed of a red lens, a contrast with the colorless transparent lens can be newly created. A sense of blending with the red color of the red transparent cap, which passes through the colorless transparent lens and can be seen reflected on the reflective surface, can also be newly created. As a result, the appearance of the lamp fixture may be further improved. Here, the "red lens" may be a transparent lens or a lens on which lens elements are formed.

In addition, the structure may have a lens step portion composed of a plurality of lens elements formed on the portion in front of the light-source bulb of the colorless transparent lens. In this case the red transparent cap is not clearly visible when the lamp fixture is observed from the front because of the existence of the lens step portion, thereby improving the appearance of the lamp fixture. Further, when observing the lamp fixture from the front, the lens step portion appears to float on the lens surface and the back of the reflective surface is visible through the surrounding colorless transparent lens portion thereof, thereby giving a three-dimensional appearance and a sense of depth to the lamp fixture.

In the foregoing structure, the lamp body may have a single reflective surface. The lamp body may also have the above-mentioned reflective surface and a second reflective surface. Forming a colorless transparent lens extending to the front portion of the second reflective lens can give a sense of uniformity in design to the lamp fixture across both reflective surfaces. An indicator lamp having an identical lamp fixture function may include a luminescent portion in two locations having a light-source bulb and red transparent cap similar to those in the above-mentioned reflective surface in the second reflective surface. Further, an indicator lamp having a different lamp fixture function can be realized by providing a transparent cap of a color other than that of the red transparent cap, or by not providing a transparent cap.

An embodiment of the present invention will be hereinafter described with reference to the drawings.

BRIEF DESCRIPTION OF THE DRAWINGS

FIG. 4 is a view of a conventional lamp example.

DETAILED DESCRIPTION

Figure 1:
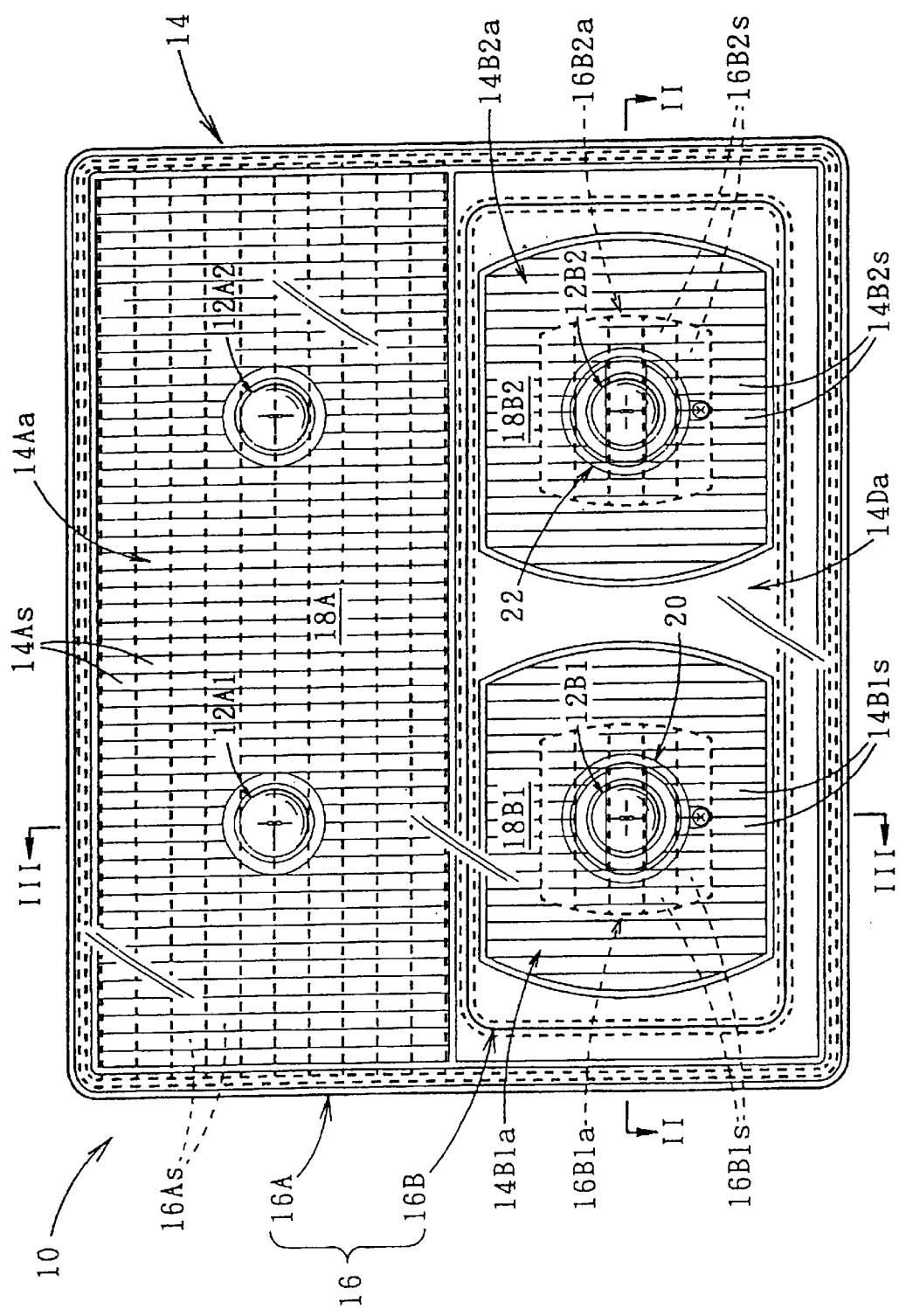
FIG. 1 is a front view of a vehicle indicator lamp according to one embodiment of the present invention.
Figure 2:
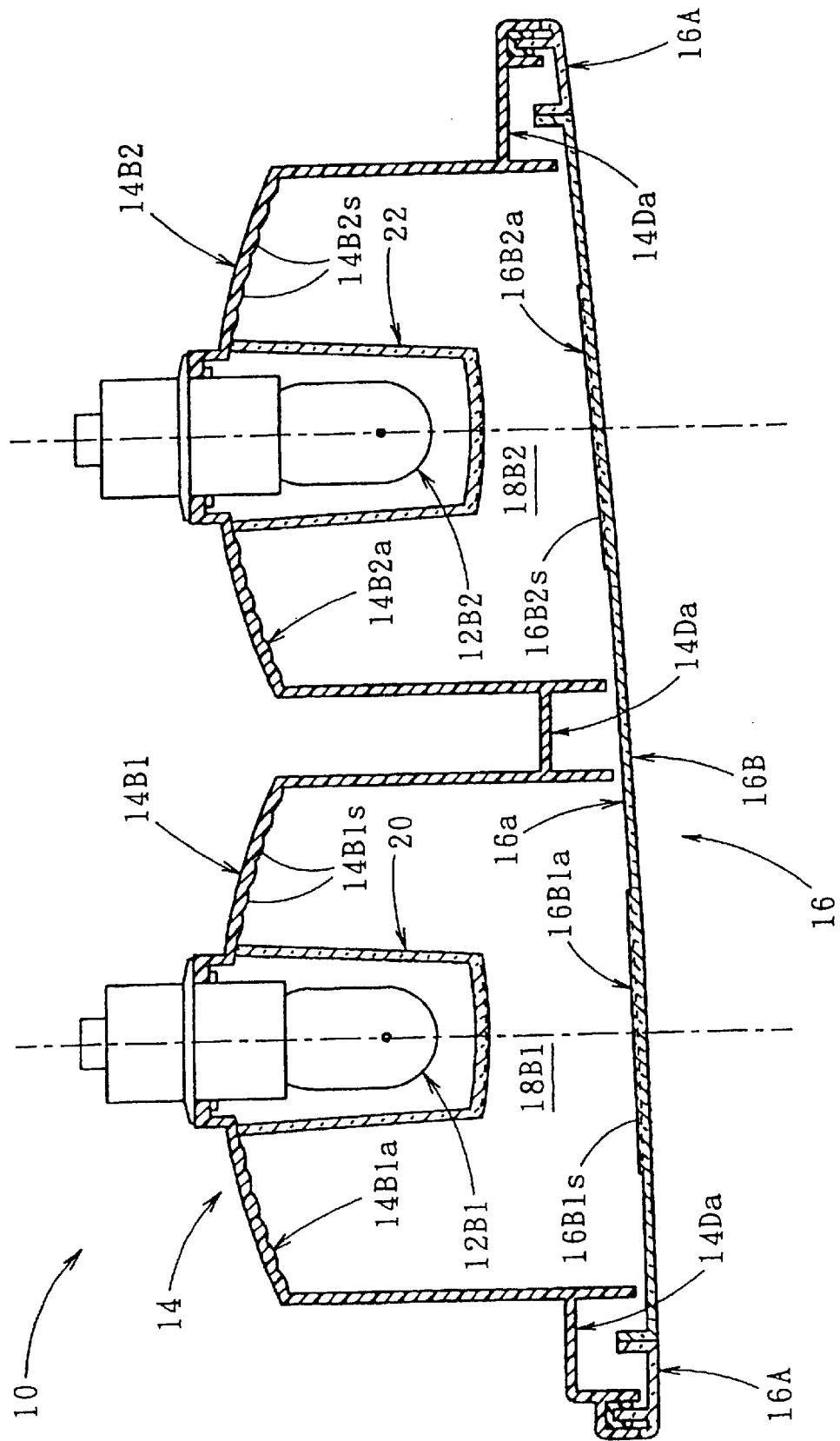
FIG. 2 is a cross-sectional view taken along lines II—II of FIG. 1.
Figure 3:
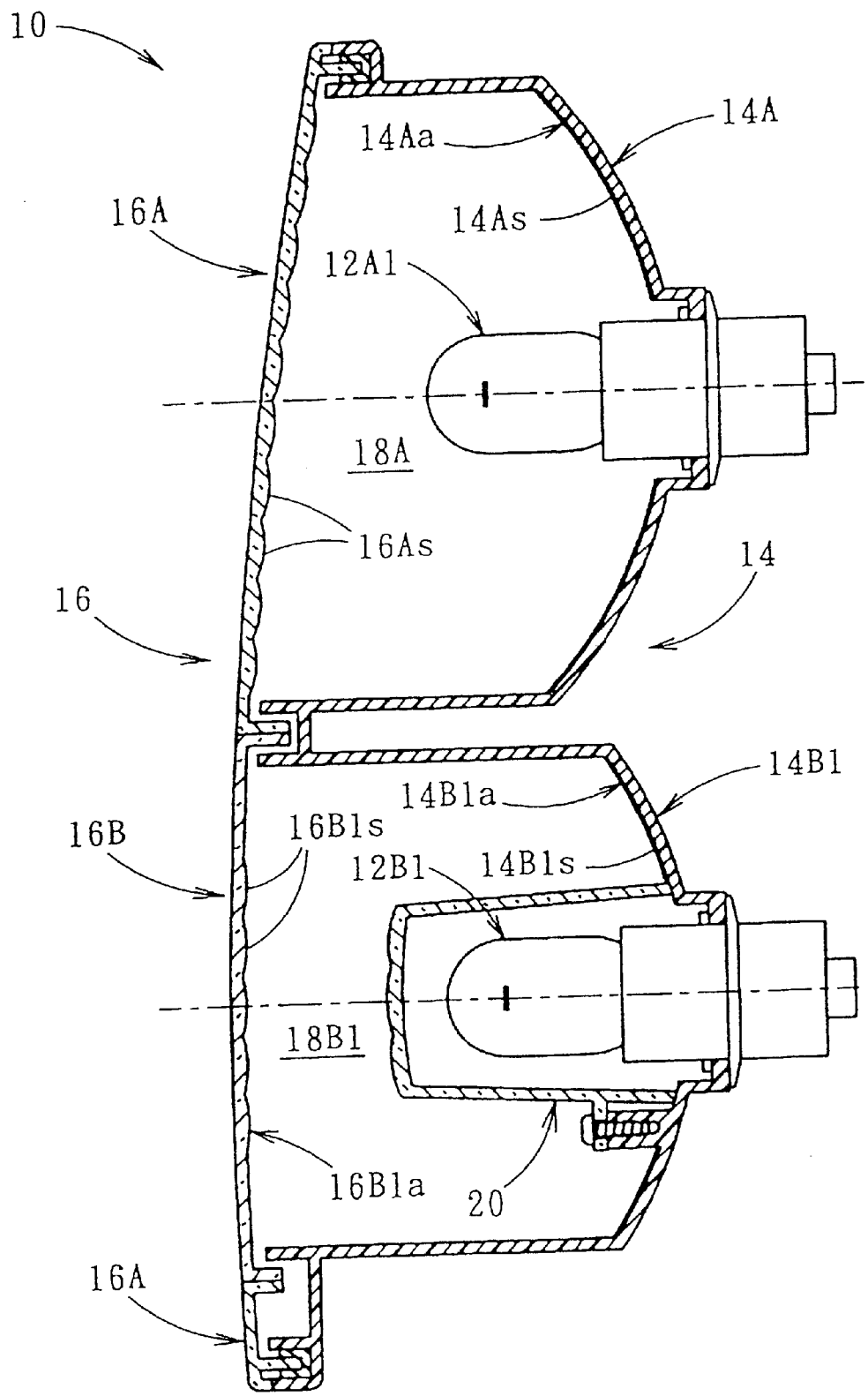
FIG. 3 is a cross section view taken along lines III—III of FIG. 1.

As shown in FIGS. 1 to 3, the vehicle indicator lamp 10 is a combination lamp combining the functions of a tail lamp, a rear fog lamp, and a back-up lamp. A lamp chamber 18A for the upper tail lamp is provided in addition to a lamp chamber 18B1 for a lower rear fog lamp and a lamp chamber 18B2 for a back-up lamp. The three lamp chambers 18A, 18B1, 18B2 are formed in a lamp body 14 and a front lens 16 is provided at the front thereof.

In the lamp body 14, the rear portion of the lamp chamber 18A is formed of a body portion 14A for the tail lamp (see FIG. 3). The rear portion of the lamp chamber 18B1 is formed of a body portion 14B1 for the rear fog lamp. The rear portion of the lamp chamber 18B2 is formed of a body portion 14B2 for the back-up lamp. Reflective surfaces 14A$a$, 14B1$a$, 14B2$a$ are formed on each of these body portions 14A, 14B1, 14B2, respectively. Also, as shown in FIG. 2, dummy reflective surface 14D$a$ is formed on the portion to the side of each body portion 14A, 14B1, 14B2 in the lamp body 14.

One pair of left and right light-source bulbs 12A1, 12A2 are inserted into the reflective surface 14A$a$. The reflective surface 14A$a$ is formed so as to have a plurality of reflective elements 14A$s$ divided in a vertically striped pattern formed such that light from each light-source bulb 12A1, 12A2 is diffused and reflected left and right.

Light-source bulbs 12B1, 12B2 are inserted into the center portion of each of the reflective surfaces 14B1$a$, 14B2 respectively. Each of these reflective surfaces 4B1$a$, 14B2$a$ include a plurality of reflective elements 14B1$s$, 14B2$s$ divided in a vertically striped pattern, respectively. As a result, light from each of the light-source bulbs 12B1, 12B2 is diffused and reflected left and right, respectively. A cylindrically shaped red transparent cap 20 is provided around the light-source bulb 12B1 and a cylindrically shaped colorless (clear) transparent cap 22 is provided around the light-source bulb 12B2. This red transparent cap 20 and the colorless transparent cap 22 are both fixed firmly with screw or other fasteners to the lamp body 14.

The front lens 16 is formed of two colors composed of a red lens 16A attached to the lamp body 14 and a colorless transparent lens 16B formed so as to fit into part of this red lens 16A. The colorless transparent lens 16B is formed in an oblong rectangular shape so as to spread over the lamp chambers 18B1, 18B2.

A plurality of lens elements 16A$s$ are formed covering the entire surface of the front portion of the lamp chamber 18A in the red lens 16A. The other portion (that portion surrounding the colorless transparent lens 16B) is formed as a transparent lens. Each of the lens elements 16A$s$ are formed with a convex cylindrical curved surface divided into a horizontally striped pattern such that reflected light from the reflective surface 14A$a$ is diffused and transmitted vertically.

Lens step portions 16B1$a$, 16B2$a$ are formed on the portion in front of each light-source bulb 12B1, 12B2 in the colorless transparent lens 16B, respectively. Each of these lens step portions 16B1$a$, 16B2$a$ are composed of a plurality of lens elements 16B1$s$, 16B2$s$, respectively. The lens elements 16B1$s$, 16B2$s$ are formed with a convex cylindrical curved surface divided into a horizontally striped pattern such that reflected light from each of the reflective surfaces 14B1$a$, 14B2$a$ is diffused and transmitted vertically.

As detailed above, the vehicle indicator lamp 10 according to the present embodiment has a cylindrically shaped red transparent cap 20 provided around the light-source bulb 12B1 in the lamp chamber 18B1 for a rear fog lamp of the vehicle indicator lamp 10. As a result, red light impinges on the reflective surface 14B1$a$ of the body portion 14B1 for the rear fog lamp, and is diffused and reflected thereby. The red light then passes through the colorless transparent lens 16B and is radiated to the front directly. Therefore, appropriately setting the diffusion and reflection angle according to the reflective surface enables a specific lamp fixture light pattern to be achieved.

The vehicle indicator lamp 10 is such that the front portion of the lamp chamber 18B1 for the rear fog lamp thereof is formed of the colorless transparent lens 16B. As a result, the reflective surface 14B1$a$ is visible through the colorless transparent lens 16B when the lamp chamber 18B1 is observed from the front. The red color of the transparent cap may be seen reflected on the entire reflective surface 14B1$a$ or a part thereof, depending on the angle of view. Therefore, the sense of transparency of the lamp fixture is improved and the vehicle indicator lamp 10 has a novel appearance compared with conventional lamps in which a single front lens was formed as a red transparent lens. The vehicle indicator lamp of this implementation thus radiates red light and exhibits superior transparency and an excellent appearance.

In addition, in the present embodiment, the reflective surface 14B1$a$ is formed of a plurality of reflected elements 14B1$s$ divided in a vertically striped pattern such that the reflection of the red color of the red transparent cap 20 onto the reflective surface 14B1$a$ is also vertically striped. As a result, the appearance of the light chamber 18B1 is even more pleasing. Further, the lens step portion 16B1$a$ composed of a plurality of lens elements 16B1$s$ is formed on a portion in front of the light-source bulb 12B1 in the colorless transparent lens 16B. The red transparent cap 20 is not clearly visible when the lamp chamber 18B1 for the rear fog lamp is observed from the front because of the existence of the lens step portion 16B1$a$, thereby allowing the appearance of the lamp fixture to be improved. In addition, when observing the lamp chamber 18B1 of the rear fog lamp from the front, the lens step portion 16B1 $a$ appears to float on the lens surface and the back of the reflective surface 14B1 is able to be seen through the surrounding colorless transparent lens portion thereof, thereby giving a three-dimensional appearance and a sense of depth to the lamp fixture.

In this implementation, the colorless transparent lens 16B is formed extending to the front portion of the reflective surface 14B2$a$ in the lamp chamber 18B2 for the back-up lamp adjacent to the lamp chamber 18B1 for the rear fog lamp. The lamp chamber 18B2 is identical to the lamp chamber 18B1 except that a colorless transparent cap 22 is provided in place of a red transparent cap 20, thereby giving a sense of uniformity in design to the lamp fixture across both lamp chambers 18B1 and 18B2.

Further, the portion other than the colorless transparent lens 16B in the front lens 16 is formed of the red lens 16A. Thus, a contrast with the colorless transparent lens 16B is created and a sense of blending with the red color of the red transparent cap 20 may be seen reflected on the reflective surface 14B1$a$ through the colorless transparent lens 16B.

As a result, the appearance of the lamp fixture is further improved. In addition, the red lens 16A has a plurality of lens elements 16As formed across the entire surface of the front portion of the lamp chamber 18A for the tail lamp thereof, and the portion aside from that portion (the portion surrounding the colorless transparent lens 16B) is formed as a transparent lens, thereby improving the eye-catching appearance of the lamp fixture design.

In the foregoing embodiment, the red transparent cap 20 and the colorless transparent cap 22 are fixed by screws to the lamp body 14, though they may also be fixed to the lamp body 14 by tab fasteners or the like.

Although the lamp fixture provided with a red transparent cap 20 is described as a rear fog lamp, a red transparent cap 20 may also be provided with other types of lamp fixtures (for example, a tail lamp or a stop lamp or the like) as long as it is a vehicle indicator lamp formed to radiate red light to the front. Operation and effect similar to that of the foregoing embodiment can be achieved by employing a lamp chamber structure similar to that described.

In the described embodiment, the lens element 16As forming a red lens 16A and each lens element 16B1s, 16B2s forming each lens step portion 16B1a, 16B2a of the colorless transparent lens 16B, are composed of lens elements of a convex cylindrical curved surface shape. However, they may also be composed of lens elements of a concave cylindrical curved surface shape, or of lens elements of a convex cylindrical curved surface shape alternating with lens elements of a concave cylindrical curved surface shape. Also, each described lens element 16As, 16B1s, 16B2s is divided in a horizontally striped pattern. However, such elements may be divided in a vertically striped pattern, a grid-like pattern, a concentric pattern, or a radial pattern or the like.

What is claimed is:

1. A vehicle indicator lamp, comprising:

a light-source bulb, a cylindrically shaped red transparent cap around said light-source bulb;

a lamp body having a reflective surface which reflects light forward from the light-source bulb, and a front lens provided at the front of the lamp body such that red light is radiated forward, wherein the reflective surface is formed to diffuse and reflect the light from the light-source bulb, and wherein at least a front portion of the front lens is formed of a colorless transparent lens and a red lens portion surrounding the colorless transparent lens.

2. The vehicle indicator lamp according to claim 1, further comprising a lens step portion composed of a plurality of lens elements formed on a portion in front of the light-source bulb in the colorless transparent lens.

3. The vehicle indicator lamp according to claim 1, further comprising a second reflective surface in the lamp body adjacent to said reflective surface and wherein the colorless transparent lens extends to the front portion of the second reflective surface.

4. A method for fabricating a vehicle indicator lamp, comprising:

forming a lamp body having at least one reflective surface that reflects light forward from a light source bulb;

connecting a red transparent cap to the light source bulb;

covering the lamp body with a front lens that includes at least a portion that is formed of a colorless transparent lens that includes a lens step portion of a plurality of lens elements; and forming a red lens portion to surround the colorless transparent lens.

5. The method of claim 4, further comprising forming a second reflective surface in the lamp body.

* * * * *